(12) United States Patent
Rothman et al.

(10) Patent No.: US 7,478,141 B2
(45) Date of Patent: Jan. 13, 2009

(54) ACCESSING FIRMWARE OF A REMOTE COMPUTER SYSTEM USING A REMOTE FIRMWARE INTERFACE

(75) Inventors: Michael A. Rothman, Gig Harbor, WA (US); Vincent J. Zimmer, Federal Way, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 10/607,753

(22) Filed: Jun. 26, 2003

(65) Prior Publication Data

US 2004/0267926 A1 Dec. 30, 2004

(51) Int. Cl.
*G06F 15/16* (2006.01)
(52) U.S. Cl. .............................. 709/217; 713/1; 713/2; 713/100; 718/100; 711/163; 719/328
(58) Field of Classification Search ................ 709/201, 709/224, 221, 222; 710/63; 713/1, 156, 713/2, 100; 714/38; 719/328; 455/412; 340/5.8
See application file for complete search history.

(56) References Cited

U.S. PATENT DOCUMENTS

| | | | | |
|---|---|---|---|---|
| 5,287,453 | A * | 2/1994 | Roberts | 709/201 |
| 5,715,387 | A * | 2/1998 | Barnstijn et al. | 714/38 |
| 6,212,575 | B1 * | 4/2001 | Cleron et al. | 719/328 |
| 6,300,863 | B1 * | 10/2001 | Cotichini et al. | 340/5.8 |
| 6,324,644 | B1 * | 11/2001 | Rakavy et al. | 713/1 |
| 6,732,267 | B1 * | 5/2004 | Wu et al. | 713/100 |
| 6,907,482 | B2 * | 6/2005 | Maciesowicz | 710/63 |
| 6,976,163 | B1 * | 12/2005 | Hind et al. | 713/156 |
| 6,986,033 | B2 * | 1/2006 | Miyamoto et al. | 713/1 |
| 7,100,031 | B1 * | 8/2006 | Reasor et al. | 713/1 |
| 7,203,831 | B2 * | 4/2007 | Wu et al. | 713/100 |
| 7,356,820 | B2 * | 4/2008 | Bower, III | 718/103 |
| 2002/0091807 | A1 * | 7/2002 | Goodman | 709/221 |
| 2002/0173294 | A1 * | 11/2002 | Nemeth et al. | 455/412 |
| 2003/0101322 | A1 * | 5/2003 | Gardner | 711/163 |
| 2003/0229694 | A1 * | 12/2003 | Tsai et al. | 709/224 |
| 2004/0177243 | A1 * | 9/2004 | Worley, Jr. | 713/2 |

* cited by examiner

*Primary Examiner*—Dustin Nguyen
(74) *Attorney, Agent, or Firm*—Blakely, Sokoloff, Taylor & Zafman LLP

(57) ABSTRACT

A method and system to access the firmware of a remote computer. The remote computer receives a request from a caller computer on a network. The request includes a task to be performed independent of an operating system of the remote computer. The remote computer processes the request and executes the task assigned in the request. The remote computer returns a response that contains information regarding the performance of the task to the caller computer. In one embodiment, the caller computer is a server and the remote computer is a client connected to the network. In another embodiment, the firmware of the remote computer operates in accordance with the Extensible Firmware Interface (EFI) framework standard.

25 Claims, 4 Drawing Sheets

ACCESSING FIRMWARE OF A REMOTE COMPUTER SYSTEM USING A REMOTE FIRMWARE INTERFACE

FIELD OF THE INVENTION

The field of invention relates generally to computer systems and, more specifically but not exclusively, relates to accessing the firmware of a remote computer system using a remote firmware interface (RFI).

BACKGROUND INFORMATION

During a computer system startup, the computer system is self-tested and initialized through loading and execution of system firmware. Under personal computer (PC) architectures, this firmware is commonly referred to as the system's Basic Input/Output System (BIOS). In a typical PC architecture, the BIOS is the firmware that runs between the processor reset and the first instruction of the Operating System (OS) loader. The BIOS also acts as an interface between software and hardware components of a computer system during the OS runtime. As computer systems have become more sophisticated, the operational environment between the application and OS levels and the hardware level is generally referred to as the firmware or the firmware environment.

Today's systems allow for remote access to computers over a network. For example, Wired for Management (WfM) is a specification from the Intel Corporation that describes the performance of certain computer configuration and maintenance functions over a network. Using WfM, the installed hardware and software of a remote computer can be determined and monitored in real time by another computer, such as a server. A feature called remote wakeup (RWU) minimizes unnecessary use of system bandwidth by keeping unused machines online only when they are needed according to a pre-planned schedule. Access to distant computers can be monitored and regulated. A server can access a remote computer to perform tasks such as repair corrupted files and programs, update the operating system, update virus programs, back up files and monitor the remote computer's health.

While the concept of remote invocation has been implemented in operating system environments, access to the firmware of a remote computer regardless of the presence of an operating system currently has limited capabilities. Without the ability to have flexible entry into the firmware infrastructure of the remote computer, a caller computer (e.g., a server) is dependent upon the data that the firmware of the remote computer is programmed to provide the caller. In some networks, the remote's firmware is limited to network boot operations and echoing of the remote system screen data at the caller's monitor. Other remote systems have specific boot-agents that communicate back to their caller in some proprietary fashion. However, these systems are vendor-specific and do not allow a single program to control remote systems in a similar manner when the remote systems come from a variety of vendors.

BRIEF DESCRIPTION OF THE DRAWINGS

The present invention is illustrated by way of example and not limitation in the accompanying figures.

DETAILED DESCRIPTION

Figure 1:
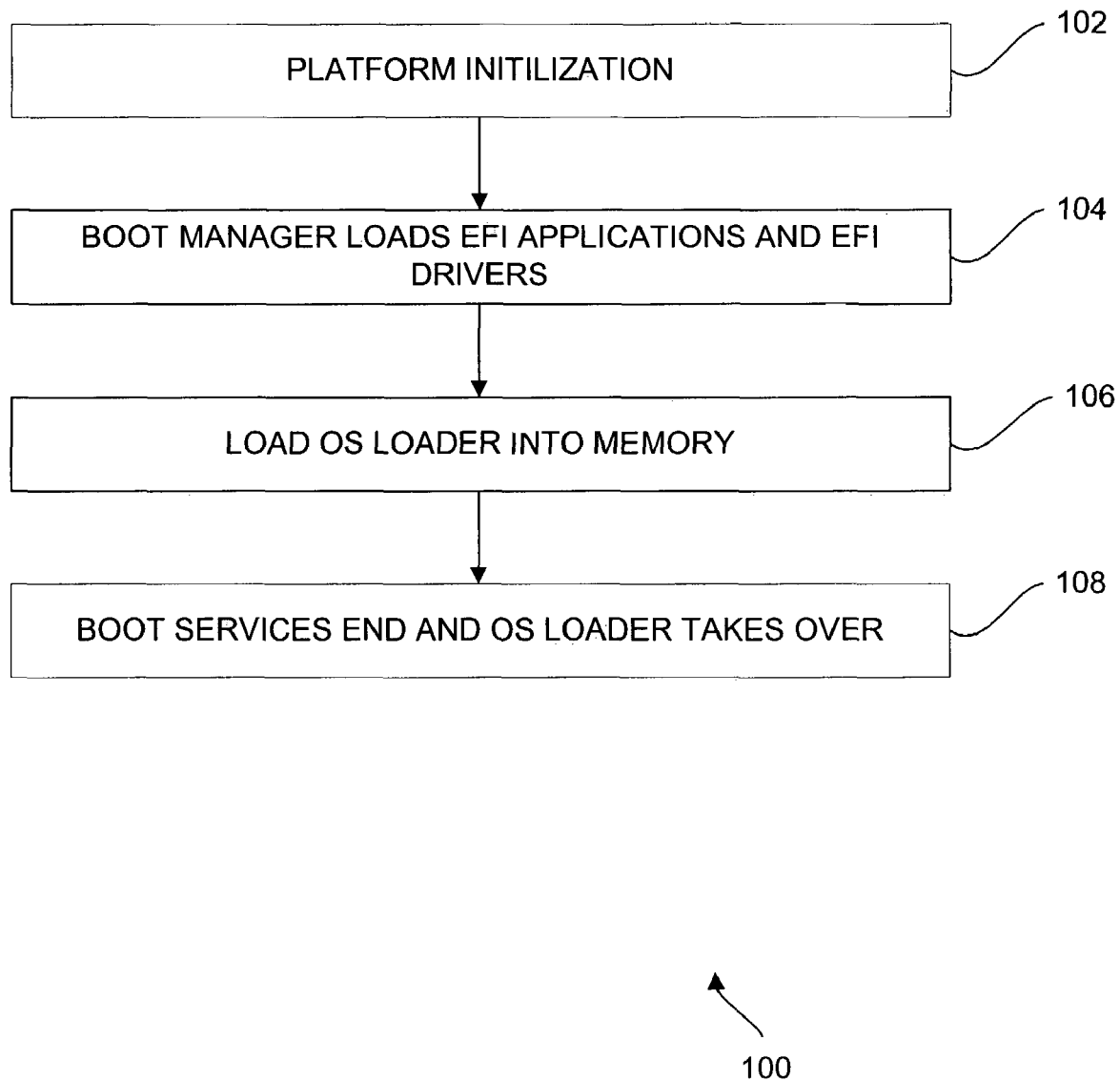
FIG. 1 is a flowchart illustrating the logic and operations performed by a computer system under the Extensible Firmware Interface (EFI) framework standard in accordance with one embodiment of the present invention.

Embodiments of a method to access firmware of a remote computer and computer apparatus for implementing the method are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, Well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, a mechanism to access the firmware of a remote computer system using a Remote Firmware Interface (RFI) is disclosed. With RFI, one can exercise program code in the firmware environment of a remote computer under the direct control of another computer. A caller computer, such as a server, has the ability to access data and initiate firmware procedures of a remote machine, such as a network client. Requested tasks are performed under the control of firmware of the remote computer and independent of the remote computer's operating system. Thus, through RFI, the remote computer can process tasks assigned by a caller during pre-boot, OS runtime, or even after the operating system has crashed.

In accordance with one embodiment, the remote firmware interface may be implemented under an extensible firmware framework standard known as the Extensible Firmware Interface (EFI) (specifications and examples of which may be found at http://developer.intel.com/technology/efi). EFI is a public industry specification that describes an abstract programmatic interface between platform firmware and shrink-wrap operating systems or other custom application environments. The EFI standard include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROMs (Compact Disk-Read Only Memory), etc.), and even over computer networks.

FIG. 1 shows an event sequence diagram 100 used to illustrate operations performed by a computer system under one implementation of the EFI framework standard. In a block 102, power is added to a computer system and the platform initialization phase begins. This phase provides a standardized method of loading and invoking specific initial configuration routines for the processor, chipset, and motherboard. The initialization phase is responsible for initializing enough of the system to provide a stable base for the follow on phases. Initialization of the platforms core components, including the processor, chipset and main board (i.e., motherboard) is performed during this phase. This phase is also referred to as the "early initialization" phase. Typical operations performed during this phase include the POST (power-on self test) routine, and discovery of platform resources, such as memory.

Once the EFI firmware is initialized, it passes control to a Boot Manager, as depicted in a block 104. The Boot Manager is a firmware policy engine that loads EFI applications and EFI drivers into memory in a pre-defined order. EFI applications are modular code that may perform specific tasks outside of the OS environment. EFI drivers are modules of code that provide device support during the boot process or during OS runtime.

The Boot Manager also produces an EFI System Table. The EFI System Table contains standard input and output handles for an EFI application, as well as pointers to the Boot Services and Runtime Services Tables. The EFI System Table may also contain pointers to other standard tables such as the Advanced Configuration and Power Interface (ACPI) Table.

The EFI specification defines two types of EFI Services: Boot Services and Runtime Services. Boot Services are not available after an OS Loader has taken control of the platform. Boot Services include, but are not limited to, Memory Services, Event and Time Services, and Image Services. In contrast to Boot Services, Runtime Services are available both during pre-boot and OS runtime operations. Runtime Services include, but are not limited to, Reset Services, Status Code Services, and Virtual Memory Services.

Functions defined in an EFI-compliant system are called through pointers in common, architecturally defined, calling conventions found in C compilers. Pointers to the various global EFI functions are found in the Boot Services table and the Runtime Services table that are located via the EFI System Table. Pointers to other functions are located dynamically through device handles. A device handle points to a list of one or more protocols that can respond to requests for services for a given device referred to by the handle. A protocol typically contains a set of protocol interfaces that are published to the computer system. System components can access a protocol by calling the protocol interface. A protocol interface also provides for passing an argument (a.k.a., a parameter) to and receiving an argument from the protocol. In one embodiment, a protocol interface is referred to as an Application Program Interface (API).

In a block 106, the EFI OS Loader is loaded into memory. The OS Loader is the first piece of operating system code loaded by the firmware to initiate the OS boot process. The OS Loader is loaded at a fixed address and then executed. In one embodiment, a user is presented with a user interface generated by firmware to select the operating system to be booted. An EFI OS Loader can support multiple OS boot options. An EFI OS Loader can also support legacy boot options such as booting from the A: drive or C: drive of the computer system.

Once the OS Loader is loaded, control of the computer system is transferred to the OS Loader, as shown in a block 108. If the OS Loader successfully loads its operating system, it can take control of the platform by using the Boot Service ExitBootServices. After successfully calling ExitBootServices, all boot services in the system are terminated. From this point the OS Loader is responsible for continued operation of the computer system. If the load of the OS fails, then the OS Loader returns an Exit call and control of the system is returned to the EFI firmware.

Figure 2:
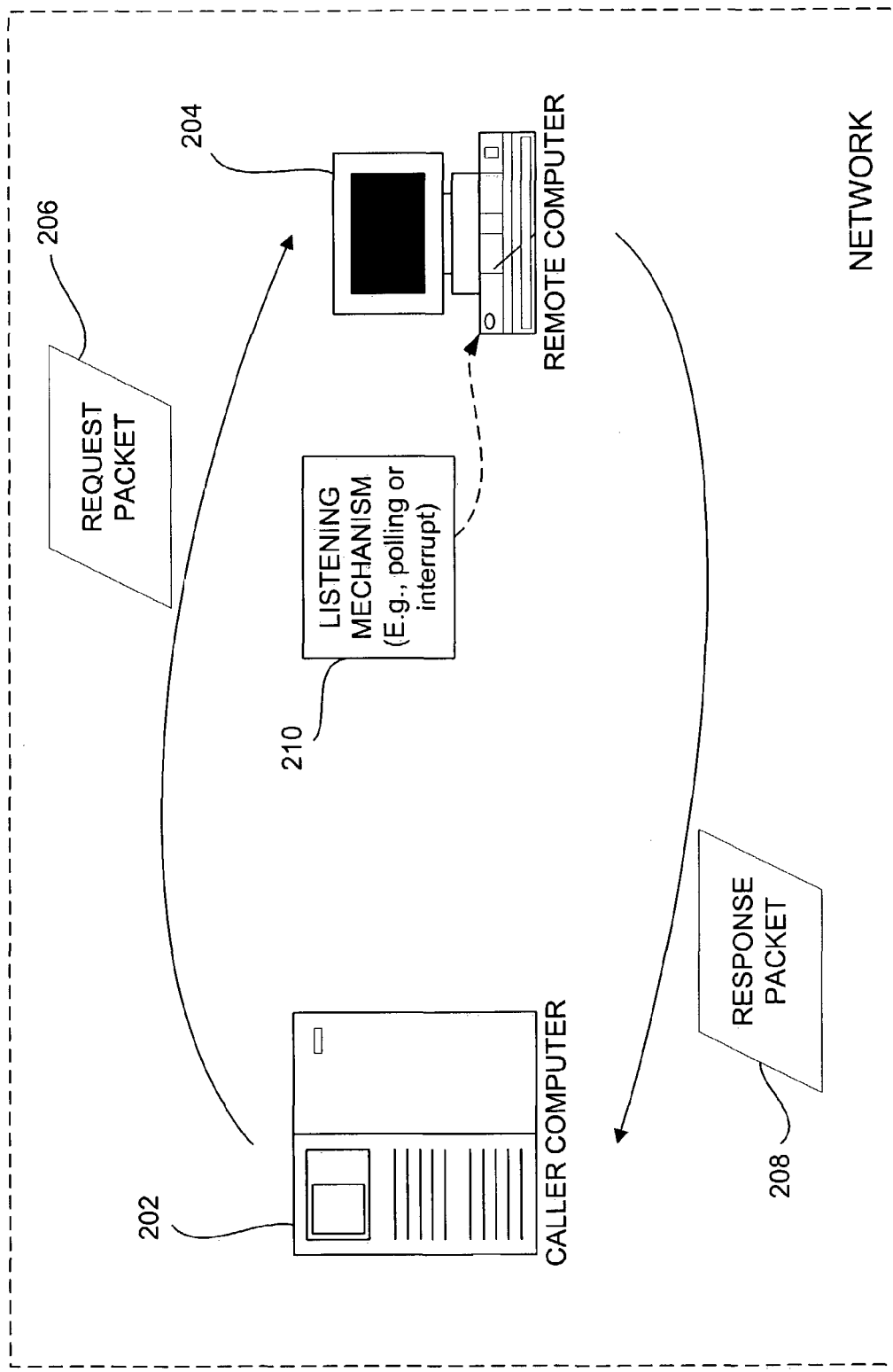
FIG. 2 is a schematic diagram of a caller computer and a remote computer in accordance with one embodiment of the present invention.

FIG. 2 illustrates an embodiment of a network 200 according to one embodiment of the present invention. Such a network may include, but is not limited to, a Local Area Network (LAN), a Wide Area Network (WAN), or a collection of LANs and WANs, such as an enterprise intranet or the Internet. The network connection may comprise a wired connection (e.g., Ethernet, token ring, etc.), a wireless connection including optical systems, satellite transmissions, or the like, or any combination thereof.

Network 200 includes a caller computer 202 and a remote computer 204. Generally, caller computer 202 and remote computer 204 include, but are not limited to, a personal computer, a network server, a network workstation, a portable computer, a handheld or palmtop computer, a personal digital assistant (PDA), or the like. In one embodiment, caller computer 202 and remote computer 204 are configured in a similar manner to an exemplary computer system discussed below in conjunction with FIG. 4. In one embodiment, the caller computer 202 is a server and remote computer 204 is a client in network 200. The network 200 is shown with one caller and one remote for clarity, but it will be understood that network 200 could contain more computer systems, each computer system capable of acting as a caller or a remote computer.

Caller computer 202 sends a request packet 206 onto the network 200 addressed for remote computer 204. In one embodiment, the request packet 206 is sent in real-time. In another embodiment, the request packet 206 is a scheduled event that occurs automatically according to a pre-planned schedule. After remote computer 204 receives the request packet 206, the remote computer 204 performs the action as defined in the request packet 206. After completing the requested action, the remote computer 204 prepares a response packet 208. The response packet 208 may contain data requested by the caller computer 202 or simply confirmation that the requested task was successfully completed or failed due to some error.

FIG. 2 also shows a listening mechanism 210 that is part of remote computer 204 and is the manner by which the remote computer 204 receives request packets. In one embodiment, the remote computer 204 uses a polling mechanism to listen for request packets; while in another embodiment, the remote computer 204 uses an interrupt mechanism. In a polling implementation, the remote computer periodically checks a particular place to see if it has received a request packet. In one embodiment, the remote determines if a Network Interface Card (NIC) has received and stored a request packet. In another embodiment, the remote checks a Universal Asynchronous Receiver/Transmitter (UART) to determine if it has received and stored a request packet from its serial port connection. If the remote determines it has received a packet, then the remote's firmware processes the request accordingly and sends a response packet back to the caller. If the remote has not received a request packet, then the remote's firmware continues performing other duties as necessary. The firmware will continually check for a request packet after a pre-determined time period.

In an interrupt implementation, the receipt of a request packet at the remote computer 204 creates an interrupt. The remote's firmware stops its current task to handle the request packet and send a response packet back to the caller. In one embodiment, the request packet signals a System Management Interrupt (SMI) for the remote to enter a System Management Mode (SMM).

SMM is a special mode for handling system wide functions and is intended for use only be system firmware, and not by an OS or an application. When SMM is invoked through an SMI, the processor saves the current state of the processor and switches to a separate operating environment contained in system management random access memory (SMRAM). While in SMM, the processor executes SMI handler code to perform operations. When the SMI handler has completed its operations, it executes a resume instruction. This instruction causes the processor to reload the saved state of the processor, switch back to protected or real mode, and resume executing the interrupted application or OS tasks.

It will be understood that the request packet 206 can be received and implemented by the remote computer 204 independent of the state. of the OS because the request packet is read and executed under the control of the remote's firmware. For example, a system administrator wishes to remotely debug a program that is installed on a plurality of remote computers on a network. The system administrator writes a script and uses a Telnet application to contact a group of remote computers and request each remote to report the contents of a particular memory address.

In another example, a system administrator pushes a firmware update to a group of remotes on a network. The firmware update execution file is included in the request packet sent to each remote. After receiving the request packet, each remote computer loads and executes the firmware update. The response packet from each remote then informs the system administrator whether the firmware update installed successfully or encountered a problem.

In another example, a system administrator is alerted that the OS running on a remote computer has become hung. In response, the system administrator sends a request packet from the server to the hung remote. The request packet asks the remote's firmware to perform a core dump and send the results back to the server. In one embodiment, the core dump captures the settings of the remote such as the memory contents, the processor settings, device settings, and the like. Even though the OS has crashed, the request packet can still be answered by the remote because the request packet is processed in the firmware environment. After the core dump is sent to the server in a response packet, the system administrator resets the remote through another RFI packet. Thus, the system administrator can return the remote computer to service and still be able to analyze the core dump at a more convenient time.

Figure 3:
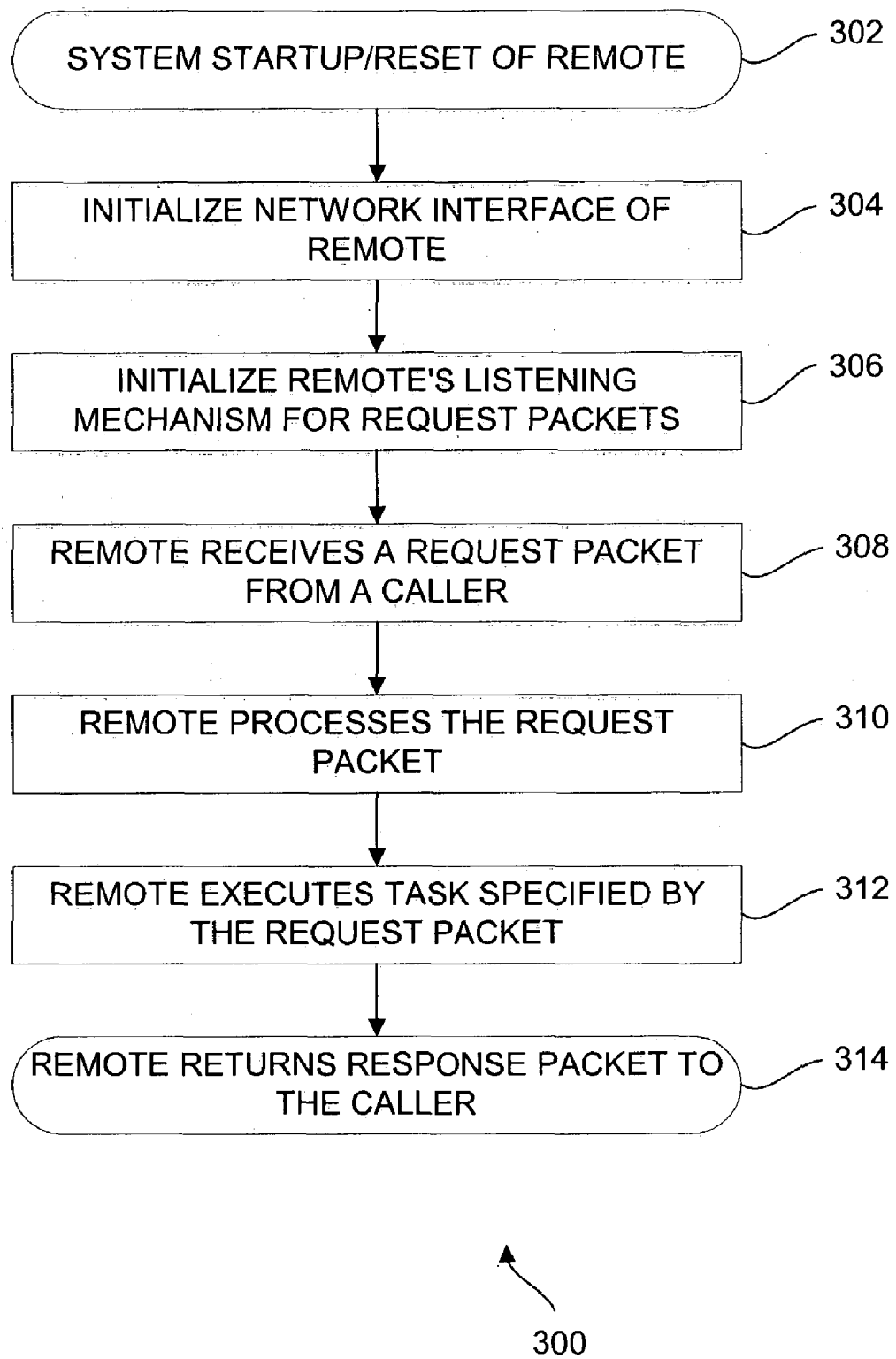
FIG. 3 is a flowchart illustrating the logic and operations performed by one embodiment of the invention to access firmware of a remote computer.

A flowchart 300 illustrating further details of logic and operations performed in accordance with one embodiment of the present invention is shown in FIG. 3. The flowchart 300 begins in a block 302, which corresponds to a system startup event, i.e., a cold boot or a system reset of a remote computer.

In response to the startup event, pre-boot initialization of the remote computer will begin through loading and execution of system boot instructions stored in the computer system BIOS firmware. In one embodiment, the system boot instructions will begin initializing the platform by conducting a Power-On Self-Test (POST) routine, initializing system board functions, checking for any expansion boards that hold additional BIOS code, and loading such BIOS code if any is found.

During the system startup, a network interface of the remote is initialized, as shown in a block 304. At this point, the remote computer is able to communicate with a network and is eligible to receive request packets from a caller computer. Continuing to a block 306, the mechanism to listen for request packets is initialized. In one embodiment, the listening mechanism is a polling scheme, while in another embodiment, the listening mechanism is an interrupt scheme.

Referring again to FIG. 3, once the listening mechanism has been initialized, the logic proceeds to a block 308 where a request packet is received from a caller by the remote. After receiving the request packet, the logic proceeds to a block 310, where the remote processes the request packet. The request packet contains one or more tasks for the remote to perform. As described below, a task includes instructing the firmware to execute code stored on the remote or another computer accessible to the remote. A task also includes providing the remote computer with code in the request packet for the remote to execute. In one embodiment, if the request packet contains a plurality of separate tasks for the firmware to perform, then the firmware returns one response packet that includes a response for each of the plurality of assigned tasks.

It will be appreciated that RFI allows for interrogation of a remote machine without the necessity of constructing a predefined binary image for the task. In one embodiment, scripting is initiated from a caller computer. A scripting language is a high-level programming language that is interpreted instead of compiled before execution. This is different from pushing code to run on a remote computer because once the program is running on the remote, the caller usually cannot interrupt the process. With the RFI mechanism, the caller computer is not limited to pre-defined capabilities that are stored on the remote computer, such as in a PXE ROM (PreBoot Execution Environment Read-Only Memory). RFI enables flexibility in interacting with the remote system as if an operator was writing code line-by-line while the remote is running. This interaction is performed at the firmware level and independent of an operating system of the remote computer. In one embodiment of an EFI-compliant system, a scripting language is used to interrogate a remote computer to determine what protocols are available to the remote. Using this information, the remote is instructed to perform a task using a particular protocol. In another embodiment, after using the scripting language to determine what protocols are stored on the remote computer, the caller computer loads a driver onto the remote computer. The caller computer then tells the remote computer to install the protocol corresponding to the driver, such as by issuing an InstallProtocolInterface command.

In one embodiment, the remote's firmware analyzes the request packet header to determine what type of request packet was sent. In one embodiment in an EFI-compliant system, such a packet header is defined as follows:

```
typedef struc {
    EFI_GUID    PacketDefinition;    //what type of packet?
    UINTN       PacketLength;        //size of the entire packet
    //UINT8     PacketData[]         //packet data
} PACKET_HEADER;
```

One type of request packet is a firmware interface packet. An interface packet is used to call a pre-defined function available to the firmware of the remote computer. In an EFI-compliant system embodiment, an interface packet includes a request to run a protocol interface function. An embodiment of an interface packet of an EFI-compliant system is defined as follows:

```
typedef struc {
    EFI_GUID    InterfaceType;    //which protocol?
    //UINT8     Parameters[];     //parameter stack
} INTERFACE_PACKET;
```

Another type of request packet is a memory packet to access a memory address of the remote computer. One embodiment of an interface packet is defined as follows:

```
typedef struc {
    UINTN      Address;      //what memory address?
    BOOLEAN    Write;        //TRUE = write memory
                             //FALSE = read memory
    UINTN      BufferSize;   //size of the packet buffer
    //UINT8    Buffer[];     //buffer to read/write
} MEMORY_PACKET;
```

Another type of request packet is a data structure packet to access data contained in a data structure accessible by the firmware of the remote computer. In an embodiment of an EFI-compliant system, the data structure packet is used to access the data maintained in an EFI table. In one embodiment, a table packet is defined as follows:

```
typedef struc {
    TABLE_TYPE       WhichTable;   //enum of tables
    CHILD_TYPE       TableEntry;   //enum of table entries
    SUBCHILD_TYPE    TableEntry;   //enum of table entries
    //UINT8          Parameters[]; //parameter stack
} TABLE_PACKET;
```

Referring to flowchart 300, after the remote processes the request packet in block 310, the task requested by the request packet is executed by the remote's firmware, as illustrated in a block 312. After completion of the task, the remote prepares and returns a response packet to the caller computer, as depicted in a block 314. In one embodiment, if the remote is unable to complete a task requested by a caller, the remote will return a request packet containing an error message for the caller. In one embodiment, such an error message includes a notice that the assigned task has failed and information as to the source of the error.

Figure 4:
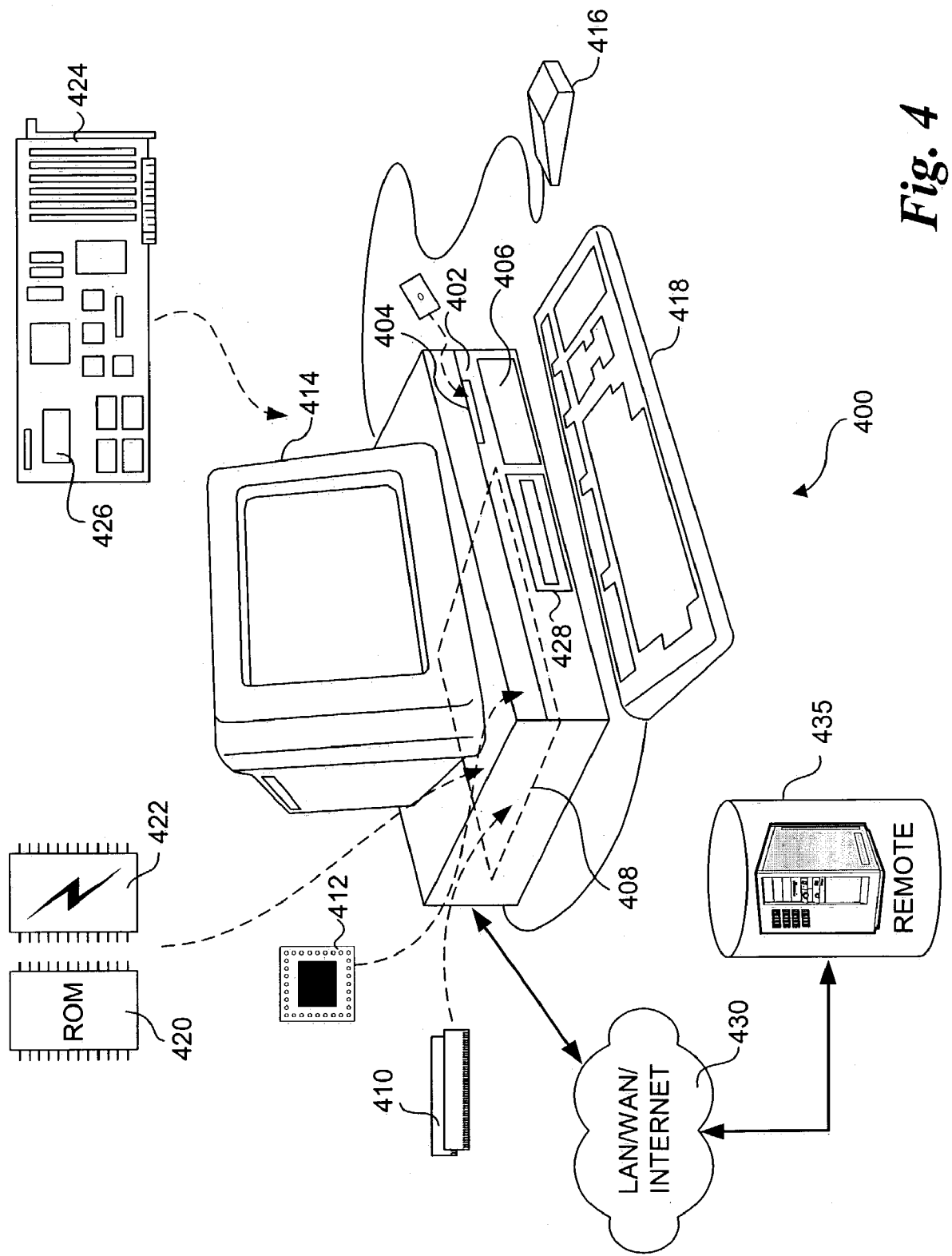
FIG. 4 is a schematic diagram illustrating a computer system that may be used to practice an embodiment of the present invention.

FIG. 4 illustrates an embodiment of an exemplary computer system 400 to practice an embodiment of the invention described above. Computer system 400 is generally illustrative of various types of computer devices, including personal computers, laptop computers, workstations, servers, etc. For simplicity, only the basic components of the computer system are discussed herein. Computer system 400 includes a chassis 402 in which various components are housed, including a floppy disk drive 404, a hard disk 406, a power supply (not shown), and a motherboard 408. The motherboard 408 includes a memory 410 coupled to one or more processors 412. Memory 410 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 412 may be a conventional microprocessor including, but not limited to, an Intel Corporation x86, Pentium, or Itanium family microprocessor, a Motorola family microprocessor, or the like. Hard disk 406 may comprise a single unit, or multiple units, and may optionally reside outside of computer system 400.

The computer system 400 also includes a non-volatile memory device on which firmware is stored. Such non-volatile memory devices include a ROM device 420 or a flash device 422. Other non-volatile memory devices include, but are not limited to, an Erasable Programmable Read Only Memory (EPROM), an Electronically Erasable Programmable Read Only Memory (EEPROM), or the like. The computer system 400 may include other firmware devices as well (not shown).

A monitor 414 is included for displaying graphics and text generated by firmware, software programs and program modules that are run by computer system 400, such as system information presented during system boot. A mouse 416 (or other pointing device) may be connected to a serial port, USB (Universal Serial Bus) port, or other like bus port communicatively coupled to processor 412. A keyboard 418 is communicatively coupled to motherboard 408 in a similar manner as mouse 416 for user entry of text and commands. In one embodiment, computer system 400 also includes a network interface card (NIC) or built-in NIC interface (not shown) for connecting computer system 400 to a computer network 430, such as a local area network (LAN), wide area network (WAN), or the Internet. In one embodiment network 430 is further coupled to a remote computer 435, such that computer system 400 and remote computer 435 can communicate. In one embodiment, a portion of the computer system's firmware is loaded during system boot from remote computer 435.

The illustrated embodiment further includes an optional add-in card 424 that is coupled to an expansion slot of motherboard 408. In one embodiment, add-in card 424 includes an Option ROM 426 on which firmware is stored. Computer system 400 may also optionally include a compact disk-read only memory ("CD-ROM") drive 428 into which a CD-ROM disk may be inserted so that executable files, such as an operating system, and data on the disk can be read or transferred into memory 410 and/or hard disk 406. Other mass memory storage devices may be included in computer system 400.

In another embodiment, computer system 400 is a handheld or palmtop computer, which are sometimes referred to as Personal Digital Assistants (PDAs). Handheld computers may not include a hard disk or other mass storage, and the executable programs are loaded from a corded or wireless network connection into memory 410 for execution by processor 412. A typical computer system 400 will usually include at least a processor 412, memory 410, and a bus (not shown) coupling the memory 410 to the processor 412.

It will be appreciated that in one embodiment, computer system 400 is controlled by operating system software that includes a file management system, such as a disk operating system, which is part of the operating system software. For example, one embodiment of the present invention utilizes Microsoft Windows® as the operating system for computer system 400. In another embodiment, other operating systems such as, but not limited to, the Apple Macintosh operating system, the Linux operating system, the Microsoft Windows CE® operating system, the Unix operating system, the 3Com Palm operating system, or the like may also be use in accordance with the teachings of the present invention.

Thus, embodiments of this invention may be used as or to support a firmware and software code executed upon some form of processing core (such as processor 412) or otherwise implemented or realized upon or within a machine-readable medium. A machine-readable medium includes any mechanism that provides (i.e., stores and/or transmits) information in a form readable by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    receiving a request to provide an indication of at least one protocol that is available to be used to perform a task on a remote computer;
    receiving an instruction to perform the task using the protocol, the instruction including receiving a request to access firmware of the remote computer using a remote firmware interface of a caller computer on a network, the remote firmware interface operating in accordance with an Extensible Firmware Interface (EFI) framework standard, wherein the task is to call a pre-defined function of firmware of the remote computer;
    determining that the task is to call a pre-defined function of firmware of the remote computer, the pre-defined function being a protocol interface function;
    executing the task at the remote computer using the protocol independent of an operating system of the remote computer, and
    sending a response to the caller computer indicating that the task is completed.

2. The method of claim 1, further comprising initializing a listening mechanism to receive the request.

3. The method of claim 2, further comprising initiating an interrupt to a processor of the remote computer by the listening mechanism when the request is received at the remote computer.

4. The method of claim 2, further comprising periodically polling a network interface of the remote computer by the listening mechanism to determine if the remote computer has received a request.

5. The method of claim 1 wherein the request is received at the remote computer in the form of a request packet.

6. The method of claim 5 wherein the request packet comprises programming code to be executed by the remote computer.

7. The method of claim 6 wherein the programming code is a scripting language.

8. The method of claim 5, further comprising receiving a second instruction to perform second task, wherein the second instruction comprises a request to access contents of a memory address of the remote computer.

9. The method of claim 5, further comprising receiving a second instruction to perform second task, wherein the second instruction comprises a request to access data of a data structure of the remote computer.

10. The method of claim 1 wherein the response is returned to the caller computer in the form of a response packet.

11. The method of claim 1 wherein the response comprises an error message if the remote computer fails to successfully execute the task.

12. An article of manufacture, comprising:
    a tangible machine-readable medium on which a plurality of instructions are stored, which when executed perform operations comprising:
    processing a request packet received from a caller computer at a remote computer over a network, the request packet including a request to provide an indication of at least one protocol that is available to be used to perform a task on a remote computer;
    processing an instruction received from the caller computer to perform the task using the protocol, the instruction including a request to access firmware of the remote computer using a remote firmware interface of the caller computer on a network, the remote firmware interface operating in accordance with an Extensible Firmware Interface (EFI) framework standard, wherein the task is to call access a memory address of the remote computer;
    determining that the task is to access a memory address of the remote computer;
    executing the task at the remote computer using the protocol independent of the operating system of the remote computer; and
    returning a response packet to the caller computer containing information regarding the outcome of the task.

13. The article of manufacture of claim 12, wherein execution of the plurality of instructions further perform operations comprising receiving a second request packet, wherein the second request packet comprises an interface packet to call a programmatic interface of firmware of the remote computer.

14. The article of manufacture of claim 12 wherein execution of the plurality of instructions further perform operations comprising receiving a second request packet, wherein the second request packet comprises a memory packet to access contents of a memory address of the remote computer.

15. The article of manufacture of claim 12 wherein execution of the plurality of instructions further perform operations comprising receiving a second request packet, wherein the second request packet comprises a data structure packet to access data of a data structure maintained by firmware of the remote computer.

16. The article of manufacture of claim 12 wherein execution of the plurality of instructions further perform operations comprising receiving a second request packet, wherein the second request packet comprises programming code to be executed under the control of firmware of the remote computer.

17. The article of manufacture of claim 12 wherein execution of the plurality of instructions further perform operations comprising receiving the request packet via a listening mechanism of the remote computer.

18. The article of manufacture of claim 17 wherein the listening mechanism comprises a polling mechanism to periodically check if the request packet is stored in a network interface of the remote computer.

19. The article of manufacture of claim 17 wherein the listening mechanism issues an interrupt to a processor of the remote computer when the request packet is received at a network interface of the remote computer.

20. A computer system, comprising:
a processor;
a network interface operatively coupled to the processor; and
at least one flash device operatively coupled to the processor on which firmware instructions are stored, which when executed by the processor perform operations comprising:
receiving a request to provide an indication of at least one protocol that is available to be used to perform a task on a remote computer;
receiving an instruction to perform the task using the protocol, the instruction including a request to access firmware of the computer system using a remote firmware interface of a caller computer on a network, the remote firmware interface operating in accordance with an Extensible Firmware interface (EFI) framework standard, wherein the task is to access data maintained in an EFI table;
determining that the task is to access data maintained in the EFI table;
performing the task at the computer system using the protocol independent of an operating system of the computer system; and
returning a response packet to the caller computer that includes information regarding the outcome of the task.

21. The computer system of claim 20 wherein receiving the request packet comprises storing at least a portion of the request packet in the network interface.

22. A method, comprising:
interrogating a remote computer over a network using a caller computer to determine at least one protocol that is available to be used to perform a task on the remote computer;
sending an instruction from the caller computer to the remote computer to perform the task, the instruction including a request to perform the task under the control of a remote firmware interface of the caller computer using the protocol of the remote computer and independent of an operating system of the remote computer, wherein the remote firmware interface operating in accordance with an Extensible Firmware Interface (EFI) framework standard, and wherein the task is to call a pre-defined function of firmware of the remote computer, the pre-defined function being a protocol interface function; and
receiving at the caller computer a response packet from each of the at least one remote computer, the response packet containing indicia relating to performance of the task.

23. The method of claim 22 wherein the request packet includes arguments for a protocol interface to be executed by the at least one remote computer.

24. The method of claim 22 wherein the request packet includes a scripting language to be executed by the at least one remote computer.

25. The method of claim 22 wherein the request packet is sent to the at least one remote computer at a pre-set time designated at the caller computer.

* * * * *